United States Patent
Patrick et al.

(10) Patent No.: US 9,919,903 B2
(45) Date of Patent: Mar. 20, 2018

(54) MULTI-SPEED ELECTRIC MOTOR

(71) Applicant: CANRIG DRILLING TECHNOLOGY LTD., Houston, TX (US)

(72) Inventors: Charles Patrick, Houston, TX (US); Kevin R. Williams, Cypress, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 565 days.

(21) Appl. No.: 14/656,370

(22) Filed: Mar. 12, 2015

(65) Prior Publication Data
US 2015/0263660 A1    Sep. 17, 2015

Related U.S. Application Data

(60) Provisional application No. 61/952,463, filed on Mar. 13, 2014.

(51) Int. Cl.
*B66D 1/12* (2006.01)
*H02P 25/00* (2006.01)
(Continued)

(52) U.S. Cl.
CPC ............... *B66D 1/12* (2013.01); *B66D 1/485* (2013.01); *H02P 25/184* (2013.01);
(Continued)

(58) Field of Classification Search
CPC ......... B66D 1/12; B66D 1/485; H02P 25/184; H02P 25/188; H02P 27/047; H02K 17/14
See application file for complete search history.

(56) References Cited

U.S. PATENT DOCUMENTS 2,709,284 A    5/1955    Evans et al.
3,231,803 A    1/1966    Pryor et al.
(Continued)

FOREIGN PATENT DOCUMENTS

WO    8908941 A1    9/1989
WO    00/76054 A1    12/2000
WO    2005021927 A1    3/2005

OTHER PUBLICATIONS

International Search Report and Written Opinion issued in International Patent Application No. PCT/US2015/020241, dated Jun. 19, 2015 (22 pages).

(Continued)

*Primary Examiner* — Emmanuel M Marcelo
(74) *Attorney, Agent, or Firm* — Adolph Locklar

(57) ABSTRACT

A multi-speed electric motor may include a plurality of windings arranged into winding phase groups. A speed controller may switch two or more windings between a series and a parallel configuration in each winding phase group. The speed controller may also switch the winding phase groups between a delta and a Wye configuration. By selecting a specific configuration, one or more of the holding torque, torque ratio, no-load maximum speed, and volts/Hz ratio of the AC motor may be optimized for a given application. In some embodiments, the AC motor may be used as part of a piece of drilling rig equipment such as a drawworks, winch, mud pump, top drive, or rotary table.

40 Claims, 4 Drawing Sheets

(51) Int. Cl.
*H02P 25/18* (2006.01)
*B66D 1/48* (2006.01)
*H02P 27/04* (2016.01)

(52) U.S. Cl.
CPC .......... *H02P 25/188* (2013.01); *H02P 27/047* (2013.01); *H02P 2207/01* (2013.01)

(56) References Cited

U.S. PATENT DOCUMENTS

| | | | |
|---|---|---|---|
| 3,653,636 A | 4/1972 | Burrell | |
| 4,046,355 A | 9/1977 | Martin | |
| 4,226,311 A | 10/1980 | Johnson et al. | |
| 4,242,057 A | 12/1980 | Bender | |
| 4,284,253 A | 8/1981 | Uribe | |
| 4,314,692 A | 2/1982 | Brauer et al. | |
| 4,338,534 A | 7/1982 | Broadway et al. | |
| 4,438,904 A | 3/1984 | White | |
| 4,441,064 A * | 4/1984 | Cutler | H02P 21/22 318/798 |
| 4,446,416 A * | 5/1984 | Wanlass | H02K 17/30 318/729 |
| 4,527,959 A | 7/1985 | Whiteman | |
| 4,545,017 A | 10/1985 | Richardson | |
| 4,545,567 A | 10/1985 | Telford et al. | |
| 4,600,874 A * | 7/1986 | Tupper | H02J 3/1892 318/798 |
| 4,873,478 A * | 10/1989 | Weiss | H02P 1/26 318/723 |
| 4,910,790 A | 3/1990 | Kerashaw | |
| 5,068,559 A | 11/1991 | Satake et al. | |
| 5,146,433 A | 9/1992 | Kosmala et al. | |
| 5,259,731 A | 11/1993 | Dhindsa et al. | |
| 5,306,124 A | 4/1994 | Back | |
| 5,306,972 A | 4/1994 | Hokanson et al. | |
| 5,331,238 A | 7/1994 | Johnsen | |
| 5,351,767 A | 10/1994 | Stogner et al. | |
| 5,375,098 A | 12/1994 | Malone et al. | |
| 5,616,009 A | 4/1997 | Birdwell | |
| 5,952,757 A | 9/1999 | Boyd, Jr. | |
| 6,029,951 A | 2/2000 | Guggari | |
| 6,094,024 A | 7/2000 | Westlake | |
| 6,182,945 B1 | 2/2001 | Dryer et al. | |
| 6,232,731 B1 * | 5/2001 | Chapman | H02M 7/49 318/400.39 |
| 6,419,465 B1 | 7/2002 | Goettel et al. | |
| 6,577,483 B1 | 6/2003 | Steicher et al. | |
| 6,995,682 B1 | 2/2006 | Chen et al. | |
| 7,462,138 B2 | 12/2008 | Shetty et al. | |
| 7,549,467 B2 | 6/2009 | McDonald et al. | |
| 7,633,248 B1 | 12/2009 | Williams | |
| 7,737,592 B2 | 6/2010 | Makino et al. | |
| 7,851,962 B1 | 12/2010 | Williams | |
| 8,368,276 B2 | 2/2013 | Wolf et al. | |
| 2002/0101122 A1 * | 8/2002 | Haines | H02P 1/32 310/68 E |
| 2002/0121823 A1 | 9/2002 | Gauthier | |
| 2004/0251766 A1 | 12/2004 | Komentani et al. | |
| 2004/0256110 A1 | 12/2004 | York et al. | |
| 2005/0073281 A1 * | 4/2005 | Kerlin, IV | H02P 6/00 318/749 |
| 2005/0206266 A1 | 9/2005 | Hans | |
| 2006/0017339 A1 | 1/2006 | Chordia et al. | |
| 2006/0049712 A1 | 3/2006 | Zepp et al. | |
| 2006/0108881 A1 | 5/2006 | Hauger et al. | |
| 2006/0108890 A1 | 5/2006 | Hauger et al. | |
| 2006/0119197 A1 | 6/2006 | Puterbaugh et al. | |
| 2006/0133905 A1 | 6/2006 | Woodruff | |
| 2006/0175064 A1 | 8/2006 | Yuratich | |
| 2006/0181238 A1 | 8/2006 | Choi et al. | |
| 2007/0053780 A1 | 3/2007 | Ruffner et al. | |
| 2007/0114856 A1 | 5/2007 | Park | |
| 2007/0228862 A1 | 10/2007 | Welchko et al. | |
| 2007/0241627 A1 | 10/2007 | Kharsa | |
| 2007/0267222 A1 | 11/2007 | Howard, Jr. et al. | |
| 2008/0061645 A1 | 3/2008 | Yukitake | |
| 2008/0116432 A1 | 5/2008 | Folk et al. | |
| 2008/0181798 A1 | 7/2008 | Folk et al. | |
| 2008/0203734 A1 | 8/2008 | Grimes et al. | |
| 2008/0265813 A1 | 10/2008 | Eschleman et al. | |
| 2008/0267785 A1 | 10/2008 | Cervenka et al. | |
| 2009/0051311 A1 * | 2/2009 | Lu | G01R 31/343 318/806 |
| 2009/0267440 A1 | 10/2009 | Komentani et al. | |
| 2011/0295269 A1 | 12/2011 | Swensgard et al. | |
| 2011/0309315 A1 | 12/2011 | Williams | |
| 2012/0112680 A1 * | 5/2012 | Chamberlin | H02P 27/06 318/503 |
| 2013/0002184 A1 | 1/2013 | Bates et al. | |
| 2013/0240808 A1 | 9/2013 | Williams | |

OTHER PUBLICATIONS

Office Action issued in U.S. Appl. No. 12/629,354 dated Dec. 19, 2011 (11 pages).
Office Action issued in U.S. Appl. No. 12/629,354 dated Dec. 31, 2012 (11 pages).
Office Action issued in U.S. Appl. No. 12/629,354 dated Apr. 11, 2012 (11 pages).
Office Action issued in U.S. Appl. No. 12/876,673 dated Apr. 5, 2013 (12 pages).
Office Action issued in U.S. Appl. No. 12/876,673 dated Oct. 24, 2012 (14 pages).
Office Action issued in U.S. Appl. No. 12/643,439, dated Aug. 7, 2012 (21 pages).
Office Action issued in U.S. Appl. No. 12/643,439, dated Feb. 10, 2012 (20 pages).
Office Action issued in U.S. Appl. No. 13/126,319, dated Mar. 27, 2013 (5 pages).
Machine translation of WO8908941 publication date Sep. 21, 1989 (2 pages).
International Preliminary Report on Patentability and Written Opinion issued in International Patent Application No. PCT/US2010/060943, dated Jul. 5, 2012 (8 pages).
For the American Heritage Dictionary definition: connected. (n.d.) The American Heritage Dictionary of the English Language, Fourth Edition. (2003). Retrieved Apr. 29, 2013 from http://www.thefreedictionary.com/connected.
For the American Heritage Dictionary definition: receiving. (n.d.) The American Heritage Dictionary of the English Language, Fourth Edition. (2003). Retrieved Apr. 30, 2013 from http://www.thefreedictionary.com/receiving.
For the American Heritage Dictionary definition: directly. (n.d.) The American Heritage Dictionary of the English Language, Fourth Edition. (2003). Retrieved Apr. 29, 2013 from http://www.thefreedictionary.com/directly.

* cited by examiner

MULTI-SPEED ELECTRIC MOTOR

CROSS-REFERENCE TO RELATED APPLICATIONS

This application is a non-provisional application which claims priority from U.S. provisional application No. 61/952,463, filed Mar. 13, 2014, which is incorporated by reference herein in its entirety.

TECHNICAL FIELD/FIELD OF THE DISCLOSURE

The present disclosure relates generally to electric motors, and specifically to selectively operating alternating current electric motors at different speeds.

BACKGROUND OF THE DISCLOSURE

Alternating current (AC) electric motors rely on alternating currents passed through induction windings within the stator to cause rotation of the rotor. So-called three phase AC motors include three matched sets of windings positioned radially about the stator. By supplying sinusoidal AC power to each of the sets of windings such that each set receives an alternating current offset by 120 degrees, a largely continuous torque can be imparted on the rotor as it rotates.

Unlike a brushed DC motor, output speed in an AC motor is controlled by the frequency of the current sent to the stator windings. In order to control output torque, and thus speed, a variable frequency drive (VFD) is used to vary the current fed to the AC motor. Because the inductive reactance of the stator windings is proportional to the frequency applied to the winding, increased voltage is necessary to maintain a relatively constant current within the windings, and thus a relatively constant output torque.

In order to properly drive the AC motor, VFD's often operate using a volts/Hz control scheme. In volts/Hz control, the VFD varies the output speed of the motor by supplying AC power to the stator windings at a particular frequency and voltage. For a given desired torque, voltage is proportionally related to the frequency by a so-called "voltage-to-frequency" or "volts/Hz" ratio. By using closed-loop feedback, a VFD using volts/Hz can maintain motor speed in changing conditions. Depending on the configuration of the stator windings, the frequency may result in different output speeds and torques for the rotor.

SUMMARY

The present disclosure provides for a method for controlling the speed of an AC motor. The method may include providing the AC motor. The AC motor may include a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, each winding phase group including at least two windings, and the windings of each winding phase group selectively reconfigurable between a series and a parallel configuration. The method may include configuring the windings of each winding phase group in the parallel or series configuration; supplying AC power to the windings of the stator at a first volts/Hz ratio, causing rotation of the rotor at a first torque ratio and a first drive ratio with a first maximum rotor speed; reconfiguring the windings of each winding phase groups from the parallel configuration to the series configuration or from the series configuration to the parallel configuration; and supplying AC power to the windings of the stator at a second volts/Hz ratio, causing rotation of the rotor at a second torque ratio and a second drive ratio with a second maximum rotor speed.

The present disclosure also provides for a method for controlling the speed of an AC motor. The method may include providing the AC motor. The AC motor may include: a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, the winding phase groups selectively configured in a Wye configuration or a delta configuration, each winding phase group corresponding to and coupled to a phase of AC power supplied to the AC motor, each winding phase group including at least two windings, and the windings of each winding phase group selectively reconfigurable between a series and a parallel configuration. The method may also include configuring the windings of each winding phase group in the parallel or series configuration; supplying AC power to the windings of the stator at a first volts/Hz ratio, causing rotation of the rotor at a first torque ratio and a first drive ratio with a first maximum rotor speed; reconfiguring the windings of each winding phase groups from the parallel configuration to the series configuration or from the series configuration to the parallel configuration; and supplying AC power to the windings of the stator at a second volts/Hz ratio, causing rotation of the rotor at a second torque ratio and a second drive ratio with a second maximum rotor speed.

The present disclosure also provides for A method for controlling the torque of an AC motor. The method may include providing the AC motor. The AC motor may include a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include determining a first torque requirement; configuring the AC motor into a first configuration in which the winding phase groups are configured in the Wye or delta configuration and the windings of each winding phase group are configured in the series or parallel configuration, the first configuration having a first torque ratio; and supplying AC power to the AC motor, rotating the rotor.

The present disclosure also provides for a method for controlling the speed of an AC motor. The method may include providing the AC motor. The AC motor may include a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include determining a first speed requirement; configuring the AC motor into a first configuration in which the winding phase groups are configured in the Wye or delta configuration and the windings of each winding phase group are configured in the series or parallel configuration, the first configuration having a drive ratio; and supplying AC power to the AC motor, rotating the rotor.

The present disclosure also provides for a method for controlling the speed of an AC motor. The method may include providing the AC motor. The AC motor may include a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include configuring the AC motor into a first configuration in which the winding phase groups are configured in the Wye or delta configuration and the windings of each winding phase group are configured in the series or parallel configuration, the first configuration having a first maximum rotor speed; supplying AC power to the AC motor, rotating the rotor; determining an optimal terminal voltage for the AC motor; and reconfiguring the AC motor into a second configuration in which the winding phase groups are configured in the Wye or delta configuration and the windings of each winding phase group are configured in the series or parallel configuration, the second configuration being different from the first configuration, the second configuration having a volts/Hz ratio capable of rotating the AC motor at the optimal terminal voltage.

The present disclosure also provides for a method for controlling the holding torque of an AC motor. The method may include providing the AC motor. The AC motor may include a rotor, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include determining a first holding torque requirement; and configuring the AC motor into a first configuration in which the winding phase groups are configured in the Wye or delta configuration and the windings of each winding phase group are configured in the series or parallel configuration, the first configuration having a first torque ratio.

The present disclosure also provides for a method for controlling the speed of a drawworks. The method may include providing a drawworks. The drawworks may include a drum driven by an AC motor. The AC motor may include a rotor, the rotor adapted to rotate the drum, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include determining a torque requirement, the torque requirement based on the weight of the load on the drawworks; configuring the AC motor into a first configuration in which the winding phase groups are configured in the Wye or delta configuration and the windings of each winding phase group are configured in the series or parallel configuration, the first configuration having a first torque ratio; supplying AC power to the AC motor; and rotating the drawworks The present disclosure also provides for a method for controlling the speed of a drawworks. The method may include providing the drawworks. The drawworks may include a drum driven by an AC motor. The AC motor may include a rotor, the rotor adapted to rotate the drum, the rotor adapted to be rotated by the interaction between an internal induced reluctance or permanent magnetic field and an electromagnetic field; and a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration. The method may also include providing a control system, wherein the control system is adapted to reconfigure the winding phase groups; measuring the weight of the load on the drawworks; determining a torque requirement using the control system, the torque requirement based on the weight of the load on the drawworks; configuring the AC motor into a first configuration in which the winding phase groups are configured in the Wye or delta configuration and the windings of each winding phase group are configured in the series or parallel configuration, the first configuration having a first torque ratio using the control system; supplying AC power to the AC motor; and rotating the drawworks.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
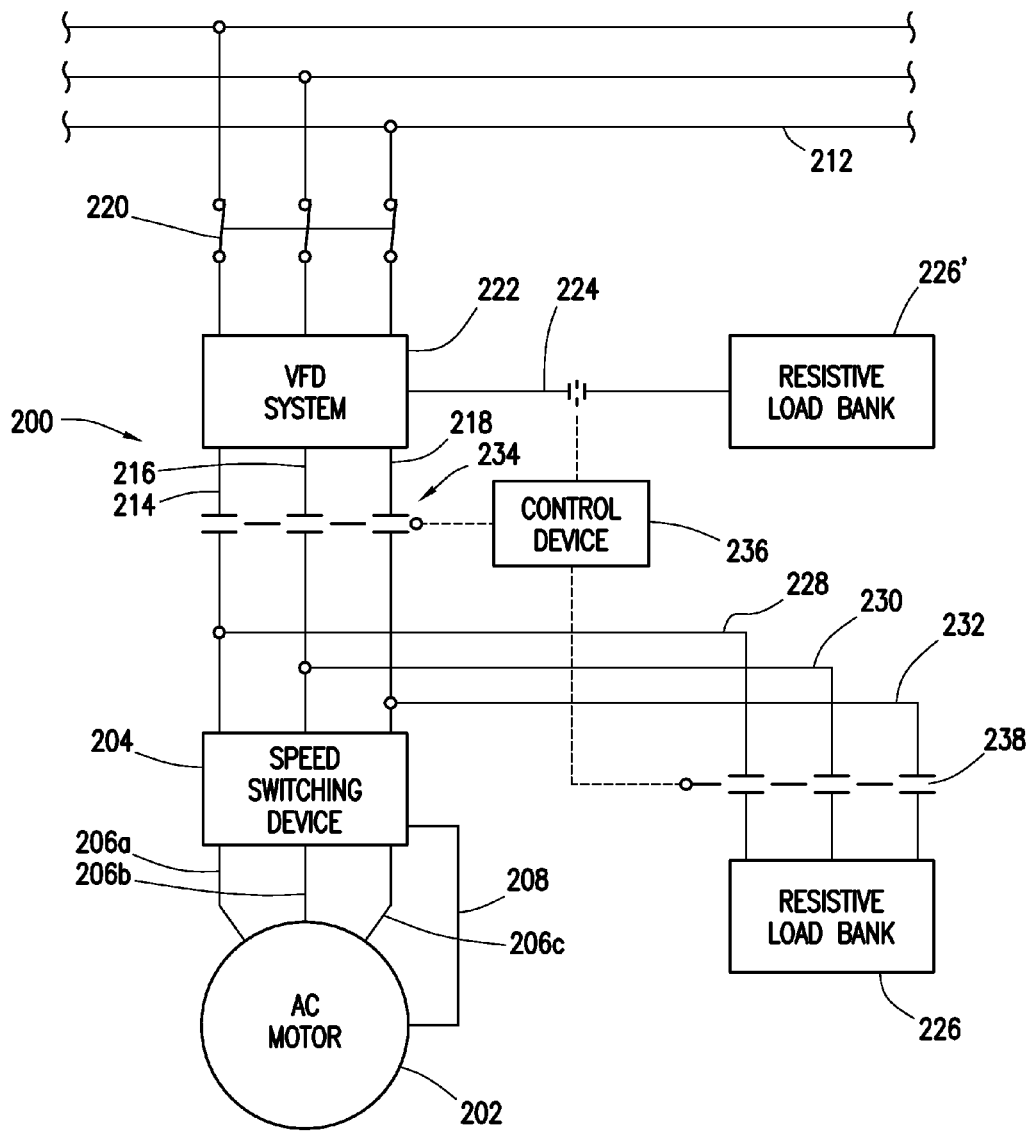
FIG. 1 depicts a schematic view of an AC motor control system consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an exemplary AC motor control system 200 consistent with embodiments of the present disclosure. AC motor 202, as depicted, may be a three-phase AC motor. As discussed below, AC motor 202 may include a rotor and stator, the stator including a plurality of stator windings. The stator windings may be grouped into three matched sets of windings positioned radially about the stator. By supplying sinusoidal AC power to each of the sets of windings such that each set generally receives an alternating current offset by 120 degrees, a torque can be imparted on the rotor as it rotates through interaction between the induced magnetic fields of the stator windings and the rotor. As understood in the art, torque produced by an AC motor is generally related to the current supplied to the AC motor and, in some instances, may be linearly related thereto. As a permanent magnet motor increases in speed, the back EMF induced by the permanent magnet motors into the stator fields also increases. The back EMF reduces the voltage available to create current and thus reduces torque. For high speed rotation, for example, the voltage supplied to the permanent magnet motor must be higher than the voltage supplied at a low speed. The ratio between motor speed and voltage supplied may thus be expressed as a volts/Hz ratio. By changing winding configurations, as will be discussed herein below, the torque output of the motor may be controlled by selecting winding configurations with different volts/Hz ratios.

In some embodiments, AC motor 202 may be a permanent magnet motor. As understood in the art, a permanent magnet AC motor includes a stator which includes windings as previously described. The rotor, which is positioned in close proximity to the stator, includes a plurality of permanent magnets positioned about its periphery. The interaction between the varying orientation of the magnetic field induced by the stator and the permanent magnet field of the permanent magnets of the rotor thus rotates the rotor.

In some embodiments, AC motor 202 may be coupled to speed switching device 204 by a plurality of conductors. For each winding phase group, as will be discussed below, at least two conductors may be used to supply AC power. Although depicted and discussed as three conductors 206a-c, one having ordinary skill in the art with the benefit of this disclosure will understand that the three conductors discussed and illustrated are meant to represent the phases of AC power supplied to AC motor 202. In some embodiments, more than 3 conductors may be utilized. For example, the number of conductors may be a multiple of two times the number of winding groups in AC motor 202.

Additionally, in some embodiments, one or more neutral conductors 208 may be included to couple the star or Wye point as discussed below to the rest of the power system. In some embodiments, a neutral conductor 208 may be omitted entirely.

Conductors 206a-c, as will be further discussed herein below, supply three-phase AC power from speed switching device 204 to the winding groups of AC motor 202. Although depicted as a single unit, one having ordinary skill in the art with the benefit of this disclosure will understand that speed switching device 204 need not be contained in a single unit, nor does it need to be positioned outside the housing or apparatus of AC motor 202.

Speed switching device 204 may be coupled to VFD system 222 via three-phase conductors 214, 216, 218. VFD system 222 may, in some embodiments, be positioned to supply modulated three-phase AC power to AC motor 202 via speed switching device 204. As understood in the art, VFD system 222 may modulate the three-phase AC power according to, for example, a volts/Hz control scheme to, for example, allow AC motor 202 to operate at a continuously variable speed for a given stator configuration. VFD system 222 may be coupled to three-phase AC supply lines 212. In some embodiments, contactor 220 may be positioned to selectively connect or disconnect AC motor control system 200 from supply lines 212. In some embodiments, DC link 224 may provide power to VFD system 222.

In some embodiments, AC motor control system 200 may include resistive load bank 226. In such embodiments, motor disconnect switch 234 may be positioned across three-phase conductors 214, 216, 218 to selectively couple three-phase conductors 214, 216, 218 to dynamic braking conductors 228, 230, 232, and dynamic braking switch 238 may be coupled to selectively couple dynamic braking conductors 228, 230, 232 to resistive load bank 226. Control device 236 may be positioned to couple motor disconnect switch 234 and dynamic braking switch 238 to allow switches 234, 238 to be operated in concert to, for example, allow resistive load bank 226 to provide dynamic braking to AC motor 202 when AC motor 202 is a permanent magnet motor. In some embodiments, control device 236 may selectively electrically couple resistive load bank 226' to DC link 224 to provide dynamic braking. As understood in the art, power regenerated by the dynamic braking of AC motor 202 may be utilized to run other electrical equipment coupled to the power supply. In some embodiments, only surplus power from DC link 224 may be passed to load bank 226'.

Figure 2:
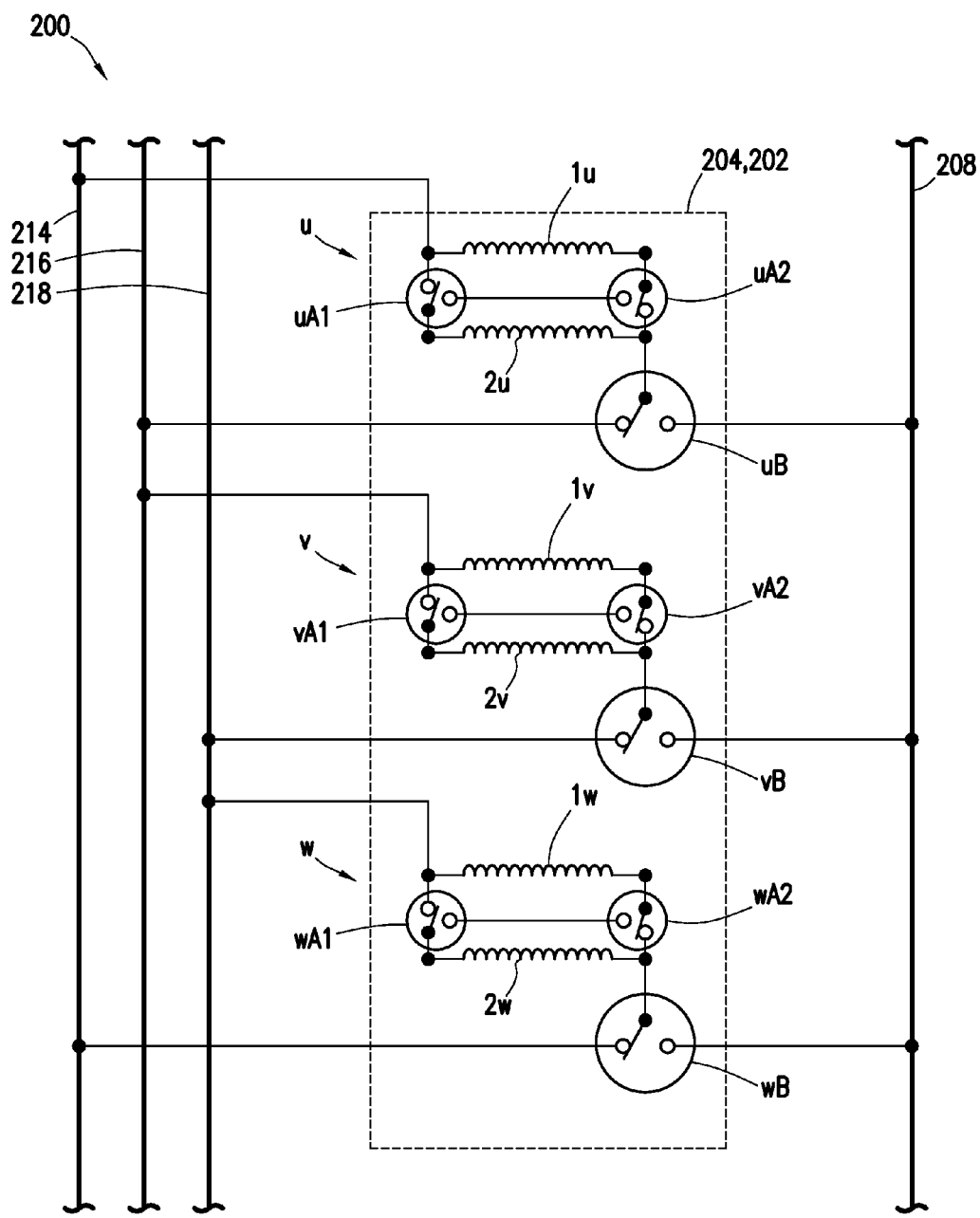
FIG. 2 depicts a schematic view of an AC motor control system consistent with embodiments of the present disclosure.

FIG. 2 depicts an exemplary embodiment of a switching mechanism of speed switching device 204. Ac motor 202 may include three phase winding groups u, v, w, each having two or more windings. FIG. 2 depicts each winding group u, v, w, having corresponding windings 1u, 2u, 1v, 2v, 1w, 2w. One having ordinary skill in the art with the benefit of this disclosure will understand that other configurations of winding groups u, v, w having more than two windings may be used without deviating from the scope of this disclosure.

For the purposes of this illustration, windings 1u, 2u, 1v, 2v, 1w, 2w are shown adjacent to switches uA1, uA2, uB, vA1, vA2, vB, wA1, wA2, wB. One having ordinary skill in the art with the benefit of this disclosure will understand that switches uA1, uA2, uB, vA1, vA2, vB, wA1, wA2, wB may be located apart from AC motor 202. Switches uA1, uA2, uB, vA1, vA2, vB, wA1, wA2, wB are positioned to selectively reconfigure the connections between windings 1u, 2u, 1v, 2v, 1w, 2w and three-phase conductors 214, 216, 218, and the interconnections of windings 1u, 2u, 1v, 2v, 1w, 2w.

Switches uA1 and uA2 are positioned to, by switching at the same time, change windings 1u and 2u from a parallel configuration (as shown) to a series configuration. Likewise, switches vA1 and vA2 and switches wA1 and wA2 are positioned to likewise transition between parallel and series configurations for windings 1v, 2v, and windings 1w, 2w respectively. Switches uA1, uA2, vA1, vA2, wA1, and wA2 are positioned to be switched simultaneously to transition each of winding groups u, v, and w between the parallel and series configurations simultaneously. FIG. 2 depicts a "parallel delta" configuration as will be discussed below.

Switches uB, vB, and wB are positioned to switch between a delta winding configuration (as shown) and a Wye configuration. As understood in the art, in a delta winding configuration, winding groups are coupled to three-phase conductors 214, 216, 218 such that the ends of each winding group are connected between two of three-phase conductors 214, 216, 218. Specifically, in the embodiment depicted in FIG. 2, when in the delta configuration, winding group u connects between three-phase conductors 214 and 216, winding group v between conductors 216 and 218, and winding group w between three-phase conductors 218 and 214. In the Wye configuration, each winding group connects between one of the three-phase conductors and the Wye or star point or, as depicted, optional neutral line 208. Switches uB, vB, and wB are positioned to be switched simultaneously. Both the switch between parallel/series and delta/Wye may, in some embodiments, be controlled by VFD system 222.

Figure 3A:
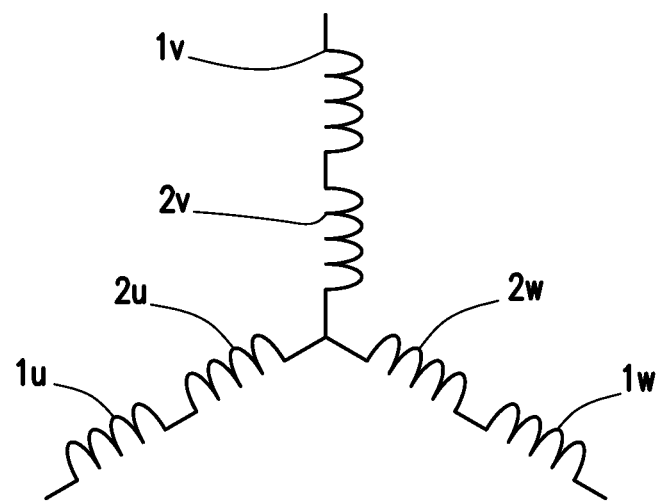
FIGS. 3a-3d depict schematic views of four stator coil configurations consistent with embodiments of the present disclosure.

By selectively actuating switches uA1, uA2, uB, vA1, vA2, vB, wA1, wA2, and wB, AC motor 202 may be selectively switched between so called series Wye (as depicted in FIG. 3a), series Delta (FIG. 3b), parallel Wye (FIG. 3c), and parallel delta (FIG. 3d) winding configurations. By reconfiguring between these configurations, the theoretical torque and rotation speed of the rotor of AC motor 202 may be varied to extend the theoretical ranges available to VFD system 222

For example, in the exemplary configuration described above, when in a series Wye configuration as depicted in FIG. 3a, the nominal torque may be calculated as:

$$Trq = \frac{6 \cdot I_n \cdot P_p \cdot \Phi_w}{2},$$

where $I_n$ is the nominal drive current, $P_p$ is the number of motor pole-pairs, and $\Phi_w$ is the nominal flux per winding. As understood in the art, the nominal torque represents the theoretical maximum torque on the rotor of AC motor 202. Similarly, the no-load speed at maximum voltage for the rotor of AC motor 202 may be calculated as:

$$\omega_m = \frac{V_I}{2\sqrt{3}\,\Phi_w P_p},$$

where $V_I$ is the nominal drive output voltage. As understood in the art, the no-load speed at maximum voltage may be interpreted as the theoretical maximum rotor speed of AC motor 202 in a given configuration.

Figure 3B:
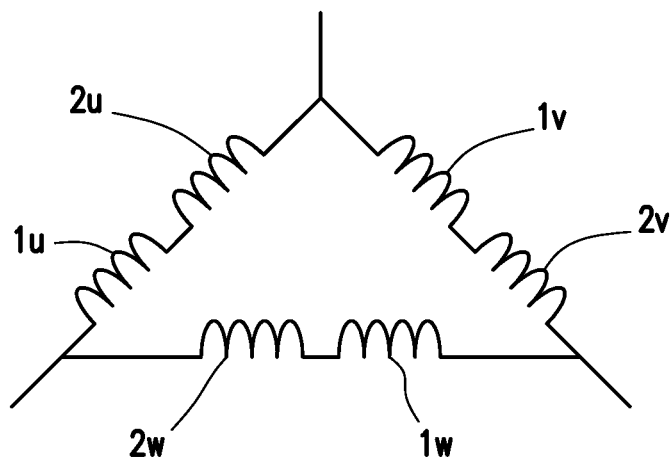

In the exemplary configuration described above, when in a series delta configuration as depicted in FIG. 3b, the nominal torque may be calculated as:

$$Trq = \frac{6 \cdot I_n \cdot P_p \cdot \Phi_w}{2\sqrt{3}},$$

and the no-load speed at maximum voltage may be calculated as:

$$\omega_m = \frac{V_I}{2\Phi_w P_p}.$$

Thus, the series delta configuration has a torque ratio of approximately 0.58 times that of the series Wye configuration. As used herein, the torque ratio approximately represents the theoretical amount of torque available in the corresponding configuration relative to another configuration, here the series Wye configuration. The series delta configuration has a no-load speed at maximum voltage of 1.73 times that of the series Wye configuration. The ratio of no-load speed at maximum voltage between configurations is referred to herein as a drive ratio.

Figure 3C:
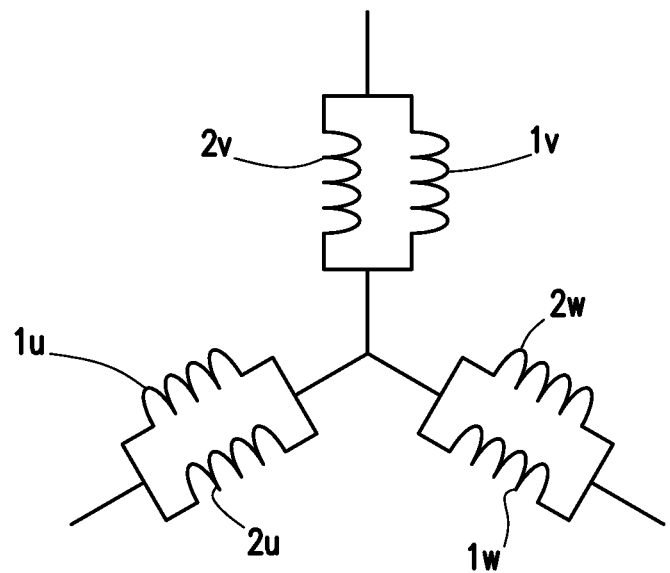
Figure 3D:
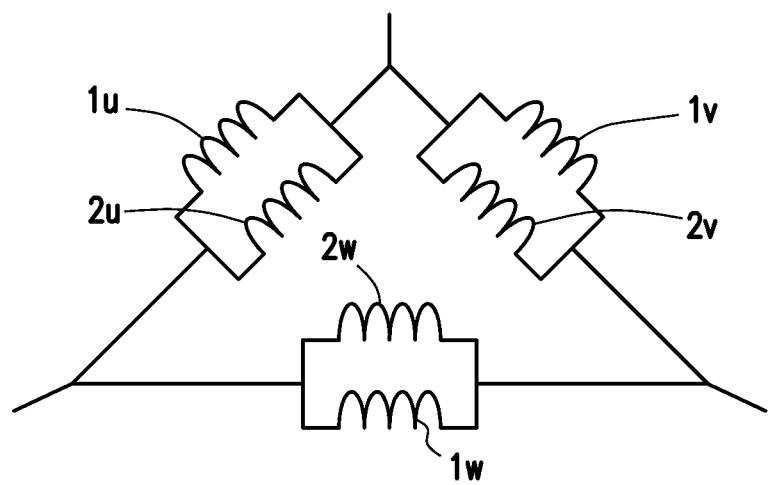

In the exemplary configuration described above, when in a parallel Wye configuration as depicted in FIG. 3c, the nominal torque may be calculated as:

$$Trq = \frac{6 \cdot I_n \cdot P_p \cdot \Phi_w}{4},$$

and the no-load speed at maximum voltage may be calculated as:

$$\omega_m = \frac{V_I}{\sqrt{3}\,\Phi_w P_p}.$$

Thus, the parallel Wye configuration has a torque ratio of 0.5 and drive ratio of 2 compared to the series Wye configuration.

In the exemplary configuration described above, when in a parallel delta configuration as depicted in FIG. 3b, the nominal torque may be calculated as:

$$Trq = \frac{6 \cdot I_n \cdot P_p \cdot \Phi_w}{4\sqrt{3}},$$

and the no-load speed at maximum voltage may be calculated as:

$$\omega_m = \frac{V_I}{\Phi_w P_p}.$$

Thus, the parallel delta configuration has a torque ratio of 0.29 and drive ratio of 3.46 compared to the series Wye configuration.

Although only six windings are described above, one having ordinary skill in the art with the benefit of this disclosure will understand that more than 6 may be utilized. For example, each winding group u, v, w may have three or more windings each. Furthermore, in some embodiments, subgroups in each of winding group u, v, w may be connected in series or in parallel to further increase the number of winding configurations available to AC motor 202.

In some embodiments of the present disclosure, AC motor 202 may be used as the motor in a piece of wellsite equipment. For example, and without limitation, AC motor 202 may be used to drive a top drive, draw works, rotary table, mud pump, winch, etc. In some embodiments, AC motor 202 may be used to drive a thruster or other propulsion device.

In order to assist with understanding of the operation of AC motor 202 in accordance with embodiments of the present disclosure, an exemplary operation will now be described in which AC motor 202 drives a drawworks. A winding configuration for AC motor 202 may be selected to have a nominal torque output matched to the load to be lifted. For example, when lifting a load which requires the full torque output capability of AC motor 202 to be applied, a winding configuration having a nominal torque output may be selected. For example, of the configurations previously discussed, a series Wye configuration may thus be selected as its torque output is the highest of the available configurations. The drawworks may thus operate in a "high torque, low speed" configuration.

If a load requiring less than the full torque output capability of AC motor 202 is to be applied, a different winding configuration having a lower torque output but higher theoretical maximum speed may be selected. Such a "low torque, high speed" configuration may allow for the load to be lifted, for example, more quickly or with a more efficient voltage supplied to AC motor 202, known as terminal voltage. Because each winding configuration allows for AC motor 202 to operate at a different volts/Hz ratio, by selecting the winding configuration based on the expected load, in this case the weight of the load to be lifted, the terminal voltage supplied to AC motor 202 may be optimized for the given expected load.

In some embodiments, an operator may manually select which wiring configuration to use before the drawworks is engaged to lift the load. In some embodiments, an automated control system may operate to select the optimal winding configuration for a given load. In some embodiments, the automated control system may utilize a memory table to associate optimal winding configurations to, for example, predefined hoisting operations, load weights, required load travel speed, etc. In some embodiments, the automated control system may be able to override the manual selection of the operator by, for example, detecting a suboptimal winding configuration selection or operating conditions.

As understood in the art, applications other than a drawworks may include different functions that likewise require such "high torque. low speed" and "low torque, high speed" configurations. Additionally, in some embodiments, accurate position control or position holding may be required. For example, a drawworks may need to hold a load at a certain height above the drill floor. Depending on the load, a winding configuration In some embodiments, AC motor 202 may also be utilized for regenerative braking. For example, while lowering a load, the drawworks may operate as a regenerative brake and transform mechanical rotation power from the lowering of the load into electrical power. Again, because the volts/Hz ratio for each winding configuration is different, an optimal winding configuration may be selected to, for example, optimize the terminal voltage of AC motor 202 while regeneratively braking Additionally, in some embodiments, accurate position control or position holding may be required. For example, a drawworks may need to hold the load at a certain height above the drill floor. Depending on the load, a winding configuration with sufficient torque may be selected to, for example, optimize the holding capability of AC motor 202 for the given load.

In another exemplary operation, AC motor 202 may drive a piece of equipment which undergoes relatively continuous operation such as a top drive. While the top drive and AC motor 202 are stopped, a winding configuration having the highest nominal torque may be selected to, for example, allow for maximum available torque to overcome the static friction involved in beginning rotation of the top drive. Of the configurations previously discussed, the series Wye configuration has the highest nominal torque value. AC power is supplied to AC motor 202 by, for example, VFD system 222 at a volts/Hz ratio corresponding to the series Wye configuration. AC motor 202 is capable of continuously variable speed by varying the voltage and frequency of AC power supplied to AC motor 202. As previously discussed, while in the series Wye configuration, AC motor 202 is capable of driving rotation up to approximately the no-load speed at maximum voltage with a relatively constant torque output. In practice, the maximum speed of AC motor 202 will be less than the no-load speed at maximum voltage owing to, for example, friction, voltage drops in the motor and elsewhere, losses to heat, etc.

Once the top drive has begun to rotate, a lower amount of torque may be required to sustain its rotation. As such, it may be more efficient to operate AC motor 202 in a different configuration for the given speed. Likewise, an operator may wish the top drive to rotate at a speed higher than AC motor 202 is capable of providing in the series Wye configuration. The operator, whether manually or automatically, may then reconfigure AC motor 202 into a different configuration depending on the desired torque and speed requirements. For example, of the configurations previously described, the series delta configuration has the next higher drive ratio and the next lower torque ratio. As AC motor 202 is reconfigured, VFD system 222 changes the voltage and frequency of its AC power output to correspond with the voltage and frequency ratio in the series delta configuration. As understood in the art, when changing from the Wye configuration to the Delta configuration, the frequency would remain the same, but a lower voltage would be required to maintain rotation at the same speed. Again, AC motor 202 is capable of continuously variable speed by varying the voltage and frequency of AC power supplied to AC motor 202 up to approximately the no-load speed at maximum voltage for the series delta configuration.

If an output speed higher than the series delta configuration is capable of outputting is desired, AC motor 202 may be again reconfigured in the same manner as previously discussed to a configuration having an even higher drive ratio. Likewise, it may be more efficient to operate AC motor 202 in a configuration having a lower torque ratio, meaning lower voltage for a given rotor speed. For example, the parallel Wye configuration has the next higher drive ratio and the next lower torque ratio. The reconfiguration may occur precisely as discussed with respect to the series delta configuration. As understood in the art, when switching from a series configuration to a parallel configuration, the frequency of the AC power supplied to AC motor 202 would be halved to maintain the rotor speed. VFD system 222 may make this adjustment to frequency as well as changing the voltage of AC power supplied to AC motor 202 as the reconfiguration occurs.

If even higher speed or more efficient operation is desired, the parallel delta configuration may be selected as, of the configurations previously discussed, it has the highest drive ratio. The reconfiguration into the parallel delta configuration may be accomplished as previously discussed.

Alternatively, once the top drive and AC motor 202 are rotating, a torque above that available to AC motor in the configuration in which it is currently configured may be required. For example, if, while drilling, a relatively hard subsurface formation is encountered after a relatively softer layer, more torque may be required to maintain rotation of a drill bit. In such an event, AC motor 202 may be reconfigured into a winding configuration having a higher torque ratio. For example, if AC motor 202 is in the parallel delta configuration, as previously discussed, any of the series Wye, series delta, and parallel Wye configurations for AC motor 202 is capable of providing more torque output. In some embodiments, the speed of AC motor 202 may be reduced to less than the no load speed at maximum voltage for the new configuration before AC motor 202 is reconfigured. This deceleration may occur naturally, or may be controlled by VFD system 222. Again, VFD system 222 may supply AC power at a volts/Hz ratio for the new configuration once AC motor 202 is reconfigured.

One having ordinary skill in the art with the benefit of this disclosure will understand that an operator needs not progress from a first configuration to the configuration having the next higher or lower torque ratio or drive ratio. Instead, any configuration may be reconfigured into any other configuration depending on, for example, the desired torque output or desired maximum speed. An operator, manually or automatically, may, for example, switch directly from the series Wye to the parallel delta configuration as long as AC motor 202 is capable of outputting sufficient torque at the new configuration. Likewise, an operator, manually or automatically, may, for example, switch directly from the parallel delta to the series Wye configuration.

Additionally, although described as using a volts/Hz control scheme, VFD system 222 may supply AC power to AC motor 202 by any control scheme including, for example and without limitation, volts/Hz, direct torque control (DTC), flux vector control, any open loop (also known as "Encoderless") variable frequency control, or any closed loop control without deviating from the scope of this disclosure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method for controlling the speed of:
providing the AC motor, the AC motor including:
a rotor, the rotor adapted to be rotated by the interaction between an internal induced reluctance or permanent magnetic field and an electromagnetic field; and
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, each winding phase group including at least two windings, and the windings of each winding phase group selectively reconfigurable between a series and a parallel configuration;
configuring the windings of each winding phase group in the parallel or series configuration;
supplying AC power to the windings of the stator at a first volts/Hz ratio, causing rotation of the rotor at a first torque ratio and a first drive ratio with a first maximum rotor speed;
reconfiguring the windings of each winding phase groups from the parallel configuration to the series configuration or from the series configuration to the parallel configuration; and
supplying AC power to the windings of the stator at a second volts/Hz ratio, causing rotation of the rotor at a second torque ratio and a second drive ratio with a second maximum rotor speed.

2. The method of claim 1, wherein the winding phase groups are selectively reconfigurable from a Wye configuration to a delta configuration.

3. The method of claim 2, further comprising:
configuring the winding phase groups in the Wye or delta configuration;
supplying AC power to the windings of the stator at a third volts/Hz ratio, causing rotation of the rotor at a third torque ratio and a third drive ratio with a third maximum rotor speed;
reconfiguring the winding phase groups from the Wye configuration to the delta configuration or from the delta configuration to the Wye configuration;
supplying AC power to the windings of the stator at a fourth volts/Hz ratio, causing rotation of the rotor at a fourth torque ratio and a fourth drive ratio with a fourth maximum rotor speed.

4. The method of claim 1, wherein the AC power is supplied by a VFD system.

5. The method of claim 1, wherein the AC motor is a permanent magnet motor.

6. A method for controlling the speed of an AC motor, the method comprising:
providing the AC motor, the AC motor including:
a rotor, the rotor adapted to be rotated by the interaction between an internal induced reluctance or permanent magnetic field and an electromagnetic field; and
a stator, the stator including a plurality of windings, the windings adapted to induce an electromagnetic field to rotate the rotor, the windings being grouped into winding phase groups, the winding phase groups selectively configured in a Wye configuration or a delta configuration, each winding phase group corresponding to and coupled to a phase of AC power supplied to the AC motor, each winding phase group including at least two windings, and the windings of each winding phase group selectively reconfigurable between a series and a parallel configuration;

configuring the windings of each winding phase group in the parallel or series configuration;

supplying AC power to the windings of the stator at a first volts/Hz ratio, causing rotation of the rotor at a first torque ratio and a first drive ratio with a first maximum rotor speed;

reconfiguring the windings of each winding phase groups from the parallel configuration to the series configuration or from the series configuration to the parallel configuration; and supplying AC power to the windings of the stator at a second volts/Hz ratio, causing rotation of the rotor at a second torque ratio and a second drive ratio with a second maximum rotor speed.

7. The method of claim 6, wherein the AC power is supplied by a VFD system.

8. The method of claim 6, wherein the AC motor is a permanent magnet motor.

9. The method of claim 6, wherein the winding configuration is automatically selected.

10. A method for controlling the torque of an AC motor, the method comprising:

providing the AC motor, the AC motor including:
a rotor, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;

determining a first torque requirement;

configuring the AC motor into a first configuration in which the winding phase groups are configured in the Wye or delta configuration and the windings of each winding phase group are configured in the series or parallel configuration, the first configuration having a first torque ratio; and supplying AC power to the AC motor, rotating the rotor.

11. The method of claim 10, further comprising:

determining a second torque requirement;

reconfiguring, while the rotor is rotating, the AC motor into a second configuration in which the winding phase groups are configured in the Wye or delta configuration and the windings of each winding phase group are configured in the series or parallel configuration, the second configuration being different from the first configuration, the second configuration having a second torque ratio higher or lower than the first torque ratio.

12. The method of claim 10, wherein the AC power is supplied by a VFD system at a volts/Hz ratio corresponding to the configuration of the AC motor.

13. The method of claim 10, wherein the AC power is supplied by direct torque control, flux vector control, open loop, or closed loop corresponding to the configuration of the AC motor.

14. The method of claim 10, wherein the first and second configurations are selected from a series Wye, a series delta, a parallel Wye, and a parallel delta configuration.

15. The method of claim 10, wherein the rotor of the AC motor is coupled to one of a top drive, drawworks, mud pump, rotary table, winch, thruster, or propulsion drive.

16. The method of claim 10, wherein the torque requirement and winding configuration are determined based on an expected load to be placed on the AC motor.

17. The method of claim 10, wherein the configuration is selected by an automated control system.

18. The method of claim 10, wherein the AC motor is a permanent magnet motor.

19. The method of claim 10, wherein the torque requirement and winding configuration are determined based on an expected holding torque to be exerted by the AC motor.

20. A method for controlling the speed of an AC motor, the method comprising:

providing the AC motor, the AC motor including:
a rotor, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;

determining a first speed requirement;

configuring the AC motor into a first configuration in which the winding phase groups are configured in the Wye or delta configuration and the windings of each winding phase group are configured in the series or parallel configuration, the first configuration having a drive ratio; and supplying AC power to the AC motor, rotating the rotor.

21. The method of claim 20, further comprising:

determining a second speed requirement;

reconfiguring, while the rotor is rotating, the AC motor into a second configuration in which the winding phase groups are configured in the Wye or delta configuration and the windings of each winding phase group are configured in the series or parallel configuration, the second configuration being different from the first configuration, the second configuration having a second drive ratio higher or lower than the first torque ratio.

22. The method of claim 20, wherein the AC power is supplied by a VFD system at a volts/Hz ratio corresponding to the configuration of the AC motor.

23. The method of claim 20, wherein the AC power is supplied by direct torque control, flux vector control, open loop, or closed loop corresponding to the configuration of the AC motor.

24. The method of claim 20, wherein the first and second configurations are selected from a series Wye, a series delta, a parallel Wye, and a parallel delta configuration.

25. The method of claim 20, wherein the rotor of the AC motor is coupled to one of a top drive, drawworks, mud pump, rotary table, winch, thruster, or propulsion drive.

26. The method of claim 20, wherein the speed requirement and winding configuration are determined based on an expected load to be placed on the AC motor.

27. The method of claim 20, wherein the configuration is selected by an automated control system.

28. The method of claim 20, wherein the AC motor is a permanent magnet motor.

29. The method of claim 20, wherein the speed requirement and winding configuration are determined based on an expected position control to be exerted by the AC motor.

30. A method for controlling the speed of an AC motor, the method comprising:
providing the AC motor, the AC motor including:
a rotor, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;
configuring the AC motor into a first configuration in which the winding phase groups are configured in the Wye or delta configuration and the windings of each winding phase group are configured in the series or parallel configuration, the first configuration having a first maximum rotor speed;
supplying AC power to the AC motor, rotating the rotor;
determining an optimal terminal voltage for the AC motor; and
reconfiguring the AC motor into a second configuration in which the winding phase groups are configured in the Wye or delta configuration and the windings of each winding phase group are configured in the series or parallel configuration, the second configuration being different from the first configuration, the second configuration having a volts/Hz ratio capable of rotating the AC motor at the optimal terminal voltage.

31. The method of claim 30, wherein the AC power is supplied by a VFD system at a volts/Hz ratio corresponding to the configuration of the AC motor.

32. The method of claim 30, wherein the AC power is supplied by direct torque control, flux vector control, open loop, or closed loop corresponding to the configuration of the AC motor.

33. The method of claim 30, wherein the first and second configurations are selected from a series Wye, a series delta, a parallel Wye, and a parallel delta configuration.

34. The method of claim 30, wherein the rotor of the AC motor is coupled to one of a top drive, drawworks, mud pump, rotary table, winch, thruster, or propulsion drive.

35. The method of claim 30, wherein the AC motor is a permanent magnet motor.

36. A method for controlling the holding torque of an AC motor, the method comprising:
providing the AC motor, the AC motor including:
a rotor, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;
determining a first holding torque requirement; and
configuring the AC motor into a first configuration in which the winding phase groups are configured in the Wye or delta configuration and the windings of each winding phase group are configured in the series or parallel configuration, the first configuration having a first torque ratio.

37. A method for controlling the speed of a drawworks, the method comprising:
providing the drawworks, the drawworks including a drum driven by an AC motor, the AC motor including:
a rotor, the rotor adapted to rotate the drum, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;
determining a torque requirement, the torque requirement based on the weight of the load on the drawworks;
configuring the AC motor into a first configuration in which the winding phase groups are configured in the Wye or delta configuration and the windings of each winding phase group are configured in the series or parallel configuration, the first configuration having a first torque ratio;
supplying AC power to the AC motor; and
rotating the drawworks.

38. The method of claim 37, wherein the AC motor is a permanent magnet motor.

39. A method for controlling the speed of a drawworks, the method comprising:
providing a drawworks, the drawworks including a drum driven by an AC motor, the AC motor including:
a rotor, the rotor adapted to rotate the drum, the rotor adapted to be rotated by the interaction between an internal induced reluctance or permanent magnetic field and an electromagnetic field;
a stator, the stator including a plurality of windings, the windings adapted to induce an electromagnetic field to rotate the rotor, the windings being grouped into winding phase groups, each winding phase group corresponding to and coupled to a phase of AC power supplied to the AC motor, the winding phase groups selectively reconfigurable from a Wye configuration to a delta configuration, and each winding phase group including at least two windings, the windings of each winding phase group selectively reconfigurable between a series and a parallel configuration;

providing a control system, wherein the control system is adapted to reconfigure the winding phase groups;

measuring the weight of the load on the drawworks;

determining a torque requirement using the control system, the torque requirement based on the weight of the load on the drawworks;

configuring the AC motor into a first configuration in which the winding phase groups are configured in the Wye or delta configuration and the windings of each winding phase group are configured in the series or parallel configuration, the first configuration having a first torque ratio using the control system;

supplying AC power to the AC motor; and rotating the drawworks.

40. The method of claim 39, wherein the AC motor is a permanent magnet motor.

* * * * *